US007766362B1

(12) United States Patent  
Helton et al.

(10) Patent No.: US 7,766,362 B1
(45) Date of Patent: Aug. 3, 2010

(54) METHOD AND APPARATUS FOR THE LINEAL, STRAIGHT, REVERSE MOVEMENT OF ONE OR MORE VEHICLES IN TOW BEHIND A PRIME MOVER

(75) Inventors: Gregory A. Helton, Marion, IA (US); Steven R. Kunert, Cedar Rapids, IA (US)

(73) Assignee: SwitchQuick, LLC, Marion, IA (US)

( * ) Notice: Subject to any disclaimer, the term of this patent is extended or adjusted under 35 U.S.C. 154(b) by 565 days.

(21) Appl. No.: 11/650,233

(22) Filed: Jan. 5, 2007

Related U.S. Application Data

(63) Continuation-in-part of application No. 10/967,911, filed on Oct. 18, 2004, now abandoned.

(60) Provisional application No. 60/544,127, filed on Feb. 13, 2004.

(51) Int. Cl.
*A01B 59/041* (2006.01)
*B60D 1/36* (2006.01)
*B60D 1/155* (2006.01)

(52) U.S. Cl. .......................... 280/474; 280/477; 280/493

(58) Field of Classification Search .................. 280/408, 280/456.1, 457, 460.1, 474, 476.1, 477, 478.1, 280/482, 490.1, 491.2, 493, 494, 495, 515
See application file for complete search history.

(56) References Cited

U.S. PATENT DOCUMENTS 2,497,234 A * 2/1950 Salvatore ................... 280/482

3,011,800 A * 12/1961 Mitsuyasu ................... 280/482
3,014,738 A * 12/1961 Kasten ....................... 280/482
3,549,174 A * 12/1970 Miles et al. ............... 280/491.1
3,612,575 A * 10/1971 Stewart ....................... 280/474
3,663,039 A * 5/1972 Morgan ....................... 280/408
3,829,131 A * 8/1974 Moore, Jr. .................... 280/493
4,126,057 A * 11/1978 von Allworden et al. ...... 74/586

* cited by examiner

*Primary Examiner*—Lesley Morris
*Assistant Examiner*—Marc A Scharich
(74) *Attorney, Agent, or Firm*—Suiter Swantz pc llo

(57) ABSTRACT

A secondary trailer hitch is provided by the present invention for allowing the lineal, straight, reverse movement of one or more vehicles in tow behind a prime mover. The secondary trailer hitch includes a housing configured for being connected with a first vehicle being towed. The secondary trailer hitch further includes an arm configured for being connected with the housing. The arm is further configured for being secured against a second vehicle when the housing is connected with the first vehicle. The secondary trailer hitch further includes a securing mechanism connected to the arm. The securing mechanism is configured for allowing a user to secure the arm against the second vehicle and is further configured for allowing a user to disconnect the apparatus from between the first vehicle and the second vehicle when the apparatus is under engagement tension from both the first vehicle and the second vehicle.

18 Claims, 13 Drawing Sheets

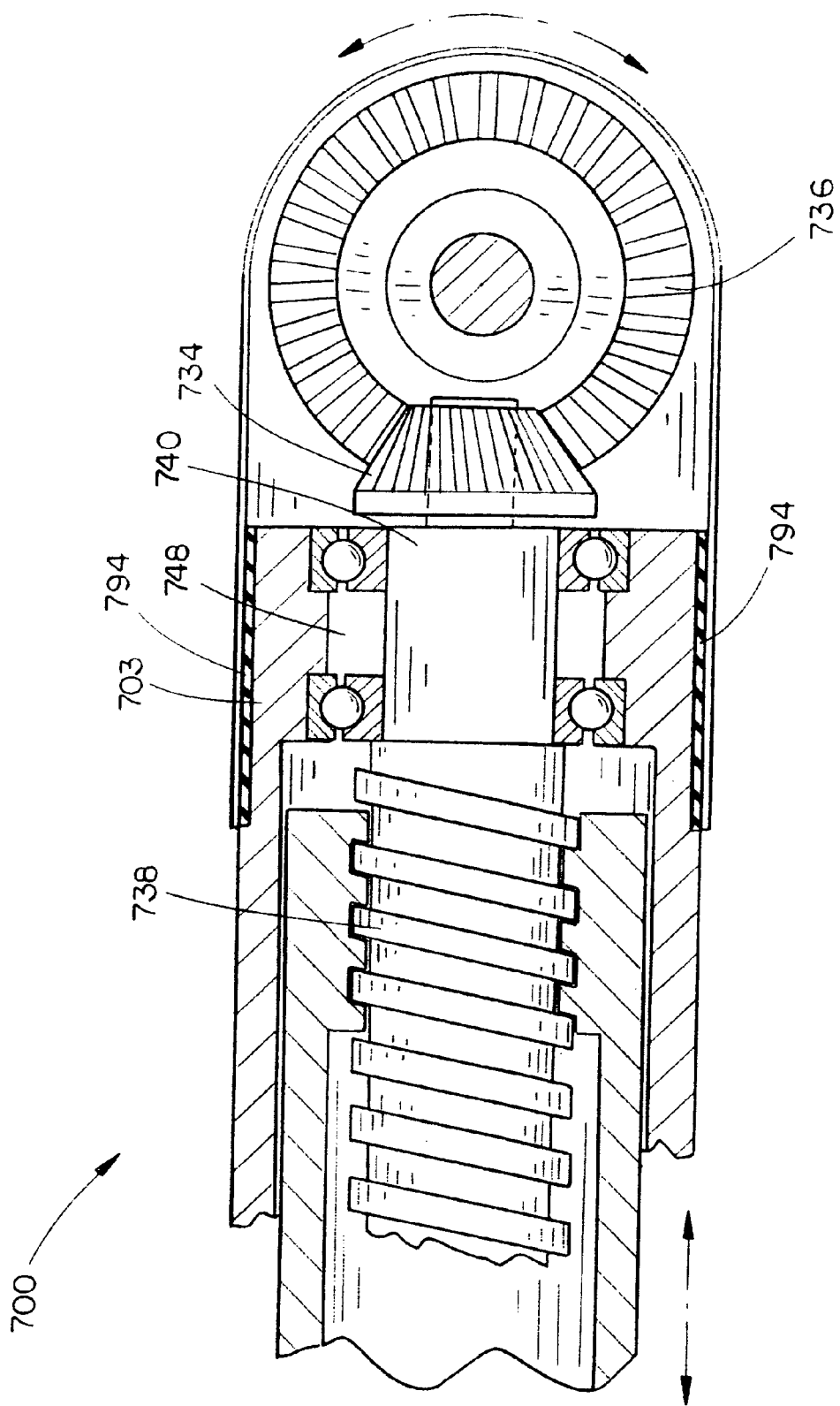

METHOD AND APPARATUS FOR THE LINEAL, STRAIGHT, REVERSE MOVEMENT OF ONE OR MORE VEHICLES IN TOW BEHIND A PRIME MOVER

CROSS-REFERENCE TO RELATED APPLICATIONS

The present application is a continuation-in-part application and claims priority under 35 U.S.C. §120 to U.S. patent application Ser. No. 10/967,911 entitled: Method And Apparatus For The Lineal, Straight, Reverse Movement Of One Or More Vehicles In Tow Behind A Prime Mover filed Oct. 18, 2004, (now abandoned) which claims priority under 35 U.S.C. §119(e) to the U.S. Provisional Application Ser. No. 60/544,127 filed on Feb. 13, 2004. U.S. Provisional Application No. 60/544,127 and U.S. patent application Ser. No. 10/967,911 are herein incorporated by reference in their entireties.

FIELD OF THE INVENTION

The present invention generally relates to the field of vehicular transportation, and particularly to an apparatus and method for moving a vehicle(s) in tow of a prime mover.

BACKGROUND OF THE INVENTION

Tractor trailers are utilized for the transportation of various goods along the roadways. Tractor trailers typically include two or more vehicles, such as a prime mover (tractor) and one or more trailers. The trailers are towed behind the prime mover and it is not uncommon to see a lead trailer connected directly to the prime mover and a secondary (rear) trailer connected via the lead trailer with the prime mover. The number of secondary trailers may range from one to two trailers connected behind the lead trailer. While forward movement of these tractor trailers is promoted through the use of a standard hitch system between the prime mover and trailer(s) it is often the case that reverse movement of these tractor trailers, especially when two or more trailers are connected to a prime mover, is problematic.

Unfortunately, many of the currently employed tractor trailer hitch systems which connect the vehicles of the tractor trailer to one another allow angular movement of the vehicles, relative to one another, during the reverse movement process. This angular movement (i.e., jackknifing) may increase the risk of damage to the vehicles or the operator of the tractor trailer.

Therefore, it would be desirable to provide an apparatus which may assist an operator of the tractor trailer during the reverse movement process in avoiding the angular movement of the vehicles relative to one another. Further, it would be desirable to provide a method of reversing a tractor trailer which may assist in avoiding damage to the vehicles and/or operator.

SUMMARY OF THE INVENTION

Accordingly, the present invention provides an apparatus for use with tractor trailers which assists in preventing angular movement of the vehicles relative to one another during the reversing process. The apparatus assists in maintaining a lineal position of the vehicles during the reverse process to assist in providing the tractor trailer a straight reverse line. This may promote an easier reversing (backing up) process for tractor trailers and reduce the level of skill required by the operators of the tractor trailer in reversing.

It is an object of the present invention to make the reversing process of tractor trailers having a prime mover (tractor) connected with multiple trailers easier. The apparatus promotes a correlated movement capability of a secondary (rear) trailer with the lead trailer, just as a prime mover (tractor) and a single trailer combination moves. Thus, the present invention has a further object of promoting the saving of time and effort to the operator of the tractor trailer when it comes to dropping and hooking multiple trailer combinations due to the increased ease of reversing provided by the apparatus.

It is a further object of the present invention to promote the increased ease of reversing or backing up a tractor trailer by providing a method by which an operator of a tractor trailer connected with multiple trailers may reverse or back up. This is accomplished through the lineal arrangement and maintenance of the multiple trailers relative to one another which allows them to be reversed in a straight line.

Additionally, the present invention assists in reducing the risk of damage to the vehicles of the tractor trailer and/or the operator of the tractor trailer during the reversing process. By allowing the vehicles (i.e., multiple trailers) to be maintained in lineal relation to one another the reversing process may become easier and therefore potential damage caused by angular movement of the vehicles relative to one another may be limited.

Accordingly, an embodiment of the present invention is directed to a secondary trailer hitch which allows for lineal, straight, reverse movement of one or more vehicles in tow behind a prime mover. The secondary trailer hitch includes a housing configured for being connected with a first vehicle being towed. The secondary trailer hitch further includes an arm configured for being connected with the housing. The arm is further configured for being secured against a second vehicle when the housing is connected with the first vehicle. The secondary trailer hitch further includes a securing mechanism connected to the arm. The securing mechanism is configured for allowing a user to secure the arm against the second vehicle and is further configured for allowing a user to disconnect the apparatus from between the first vehicle and the second vehicle when the apparatus is under at least one of engagement tension and engagement compression from both the first vehicle and the second vehicle.

A further embodiment of the present invention is directed to an apparatus, for use in towing one or more vehicles behind a prime mover, including: a housing configured for being connected with a first vehicle being towed; an arm configured for being connected with the housing, the arm further configured for being secured against a second vehicle when the housing is connected with the first vehicle; a drive assembly configured for being connected with the arm, the drive assembly further configured for allowing the arm to be selectively extended from and retracted into the housing; and a securing mechanism configured for being connected with a gear assembly via the housing, the gear assembly being connected to the drive assembly, the securing mechanism being further configured for driving the gear assembly for selectively causing the drive assembly to extend the arm from and retract the arm into the housing, the securing mechanism being further configured for allowing a user to disconnect the apparatus from between the first vehicle and the second vehicle when the apparatus is under at least one of engagement tension and engagement compression from both the first vehicle and the second vehicle, wherein the apparatus provides for lineal, straight, reverse movement of the first vehicle in tow behind the second vehicle.

An additional embodiment is directed to an apparatus, for use in towing a plurality of vehicles behind a prime mover, including: a housing configured for being connected with a first vehicle being towed; an arm configured for being connected with the housing, the arm having a first end and a second end, the first end of the arm being configured for being insertably and slidably received within the housing, the second end of the arm including a bumper mechanism for being secured against a second vehicle when the housing is connected with the first vehicle; a drive assembly having a first end configured for being connected with a gear assembly and a second end configured for being connected with the arm, the drive assembly is configured for allowing the arm to be selectively extended from and retracted into the housing; and a handle configured for being rotatably connected with the gear assembly via the housing, the gear assembly being rotatably connected to the first end of the drive assembly, the gear assembly including a first gear and a second gear, the first gear and the second gear being rotatably interlocked, the first gear being perpendicularly oriented with respect to the second gear, the handle being further configured for being rotated in a first direction for driving the gear assembly and for causing rotation of the drive assembly for extending the arm from the housing, the handle being further configured for being rotated in a second direction for driving the gear assembly, the second direction being generally opposite the first direction, and for causing rotation of the drive assembly for retracting the arm into the housing, the handle being further configured for allowing a user to disconnect the apparatus from between the first vehicle and the second vehicle when the apparatus is under at least one of engagement tension and engagement compression from both the first vehicle and the second vehicle, wherein the apparatus provides for lineal, straight, reverse movement of the first vehicle in tow behind the second vehicle.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 8A is a top cut-away view of a secondary trailer hitch in accordance with an exemplary embodiment of the present invention;

DETAILED DESCRIPTION OF THE INVENTION

Figure 1:
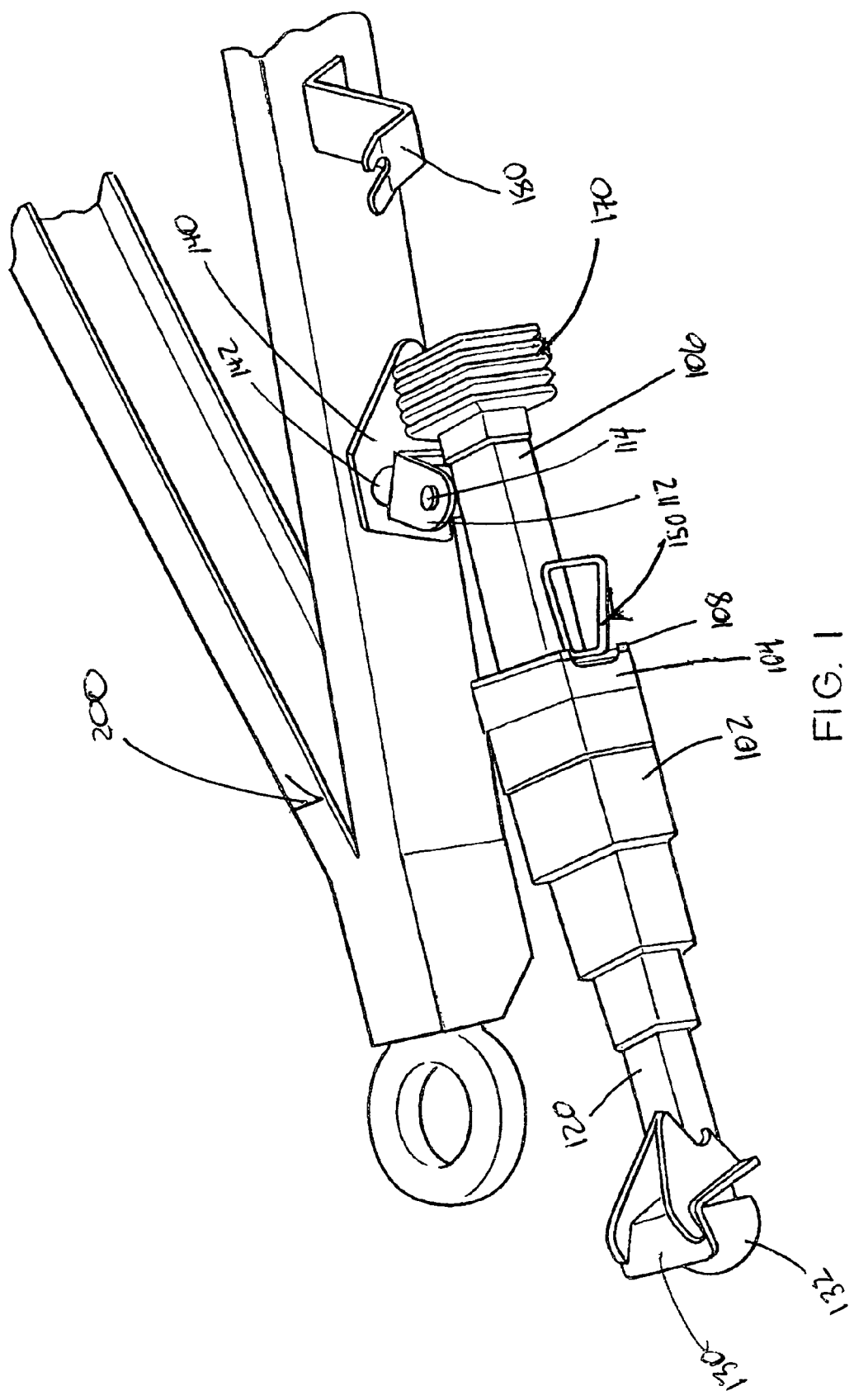
FIG. 1 is an isometric illustration of a secondary trailer hitch connected with a jiff lox dolly in accordance with an exemplary embodiment of the present invention.
Figure 2:
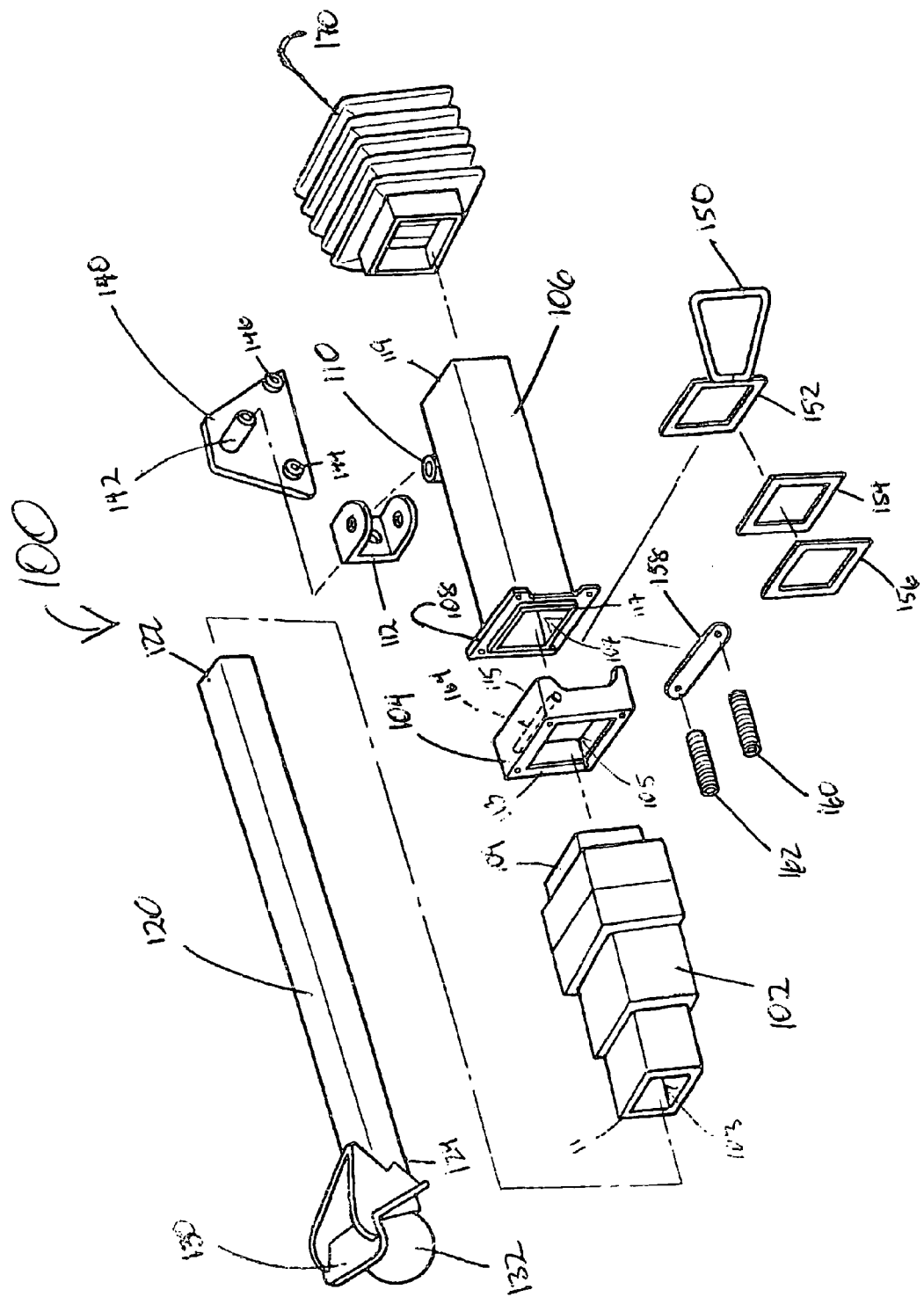
FIG. 2 is an exploded view illustrating the secondary trailer hitch.

Reference will now be made in detail to the presently preferred embodiments of the invention, examples of which are illustrated in the accompanying drawings.

Referring generally now to FIGS. 1 through 5B and FIGS. 7 through 10, exemplary embodiments of the present invention are shown. A secondary trailer hitch of the present invention allows for the lineal, straight reversing movement of vehicles, such as a trailer, in tow behind another vehicle, such as a prime mover (i.e., tractor). The secondary trailer hitch may be connected with a trailer which is in tow behind a lead trailer, the lead trailer being in tow behind a prime mover. Thus, the present invention may be employed in a single trailer or a multiple trailer configuration of various vehicles, such as tractor trailers, and the like. For example, the multiple trailer configuration may include a prime mover towing a lead trailer which is further connected to a secondary trailer. The present invention provides an apparatus which establishes a secondary connection between the secondary trailer and lead trailer which allows for the lineal, straight reversing movement of both the lead trailer and the secondary trailer relative to one another. It is contemplated that multiple secondary trailer hitches may be employed, such as when a prime mover is towing three trailers. A first secondary trailer hitch may provide a connection between the lead trailer and the second trailer and a second secondary trailer hitch may provide the connection between the second trailer and a third trailer. It is further contemplated that the secondary trailer hitch may be employed with various vehicles which may be towed behind a prime mover, such as a car towing one or more other cars, boat trailers, and the like.

The present invention may further provide for the correction of angular displacement of vehicles during the reversing process. For example, a prime mover may be reversing a lead trailer connected with a secondary trailer. During the reverse movement the secondary trailer becomes angularly displaced from a lineal alignment with the lead trailer. The secondary trailer hitch, mounted on the secondary trailer, is connected with the lead trailer. Then, during further reverse movement, the secondary trailer hitch provides the force through which the secondary trailer is re-positioned back into lineal alignment with the lead trailer.

Referring now to FIGS. 1 through 5B, a first embodiment of a secondary trailer hitch 100 includes a housing which includes a first section 102 connected with a second section 104 which is connected via a connector plate 108 with a third section 106. Included on the third section 106 is a receiver 110 which further connects with a bracket 112. Through the connection of bracket 112 with the third section 106, the housing is connected with a mounting mechanism. The mounting mechanism includes a mount plate 140 which includes an adapter 142 for connecting with the bracket 112. The mount plate 140 further includes a first fastening point 144 and a second fastening point 146. The adapter 142, first fastening point 144, and second fastening point 146 allow for the connection of the mount plate 140 to a jiff hitch 200 (described below) which is connected to the vehicles, such as the lead trailer and/or secondary trailer, or various other locations upon the vehicles.

An arm assembly includes an arm 120 including a first end 122 and a second end 124. The first end 122 is for being received within the housing allowing the arm 120 to be slidably positioned within the housing. The second end 124 of the arm 120 includes a bumper mechanism which includes a bumper bracket 130 and a brace 132. The arm 120 is capable of being re-positioned within the housing through the use of a lock mechanism which connects with both the housing and the arm 120. The lock mechanism includes a handle 150 connected with a first lock plate 152. Further connected with the first lock plate 152 is a second lock plate 154, the second lock plate being further connected with a third lock plate 156. The first through third lock plates are in contact with the arm 120 and the third lock plate 156 is in further contact with a lock bracket 158. The lock bracket 158 is connected with a first spring 160 and a second spring 162. The first and second springs connect with an interior portion of the second section 104 of the housing on the end opposite the connection with the lock bracket 158. The first and second springs through the connection with the lock bracket 158 and second section 104 provide a force against the third lock plate 156. A lock bar 164 is connected on the interior of the second section 104 in a position which allows the first lock plate 152 to engage against it. The lock bar 164 provides an axis about which the first through third lock plates are pivoted by a user engaging with the handle 150.

In the current embodiment, the housing includes a first, second, and third sections 102, 104, and 106, respectively. These three sections may be connected to one another through the use of various fasteners, such as bolts, screws, clips, pins, and the like. In a preferred embodiment, the three sections align threaded receiving points which may be engaged by a threaded fastener, such as a threaded bolt, thus, connecting the three sections together. A connector plate 108 is secured to the third section 106 to provide for the connection of the three sections. The connector plate 108 includes threaded receiving points which align with the threaded receiving points on the first and second section 102 and 104 allowing the threaded fastener to be inserted and securely connect the three sections of the housing. In the alternative, the three sections may employ various mechanical connection mechanisms to connect with one another. For example, a snap fit system may be constructed upon the three sections to provide for a secure connection. Other mechanisms, such as a compression lock system, friction fit system, quick connection system, and the like may be employed to provide for the connection of the three sections.

The first section 102 of the housing defines a recessed area 103 which extends the length of the first section 102. The recessed area 103 is configured for receiving the arm 120 within, allowing for a sliding insertion, positioning, and removal of the arm 120 from within the recessed area 103. The second section 104 of the housing defines a second recessed area 105 which extends the length of the second section 104 and the third section 106 defines a third recessed area 107 which extends the length of the third section 106. The second and third recessed area 105 and 107 are configured for receiving the arm 120 within, allowing for a sliding, insertion, positioning, and removal of the arm 120 from within the recessed areas. Thus, when the first, second, and third section 102, 104, and 106 are connected together, the first recessed area, second recessed area, and third recessed area 103, 105, and 107, respectively, are aligned to allow for the insertion, positioning, and removal of the arm 120.

In the current embodiment, the connector plate 108 is connected with the third section 106 via a standard welding process, but it is contemplated that alternative welding techniques may be employed. It is further contemplated that the connector plate 108 may be integral with the third section 106. The construction of the third section 106 may include the forming of an end of the third section to include the threaded receiving points similar to that shown for connector plate 108. Alternatively, the connector plate 108 may be removable from the third section 106. The removable connector plate 108 may be secured to the third section through the use of various fasteners, such as clips, pins, bolts, screws, and the like. In the alternative, the removable connector plate 108 may be secured to the third section through the use of various mechanical connection mechanisms, such as a snap fit system, quick connect system, compression lock system, and the like.

It is contemplated that the first section 102 is constructed as a telescoping first section 102. The telescoping first section 102 provides an extendable and retractable section which may promote the stability of the arm 120 when extended for use and the storage capabilities of the arm 120 and housing when the arm 120 is not in use. In a preferred embodiment, the first section 102 includes contouring for a more aesthetically appealing apparatus. The first section 102 is constructed to provide a defined length which may be determined as optimal for supporting the use of the arm 120 and storage of the apparatus when not in use. For example, the length of the first section 102 is constructed to extend as far along the arm 120 when the arm 120 is being engaged with another vehicle but still allow for the apparatus to be engaged with a storage support 180 when not in use.

A first end 109 of the first section 102 is constructed to connect with the second section 104. In the current embodiment, the first end 109 at least partially inserts with the second recessed area 105 defined by the second section 104. Thus, the second recessed area 105 may be defined by the configuration of the first end 109. For example, the larger the first end 109 the larger the second recessed area 105. It is further contemplated that the first end 109 may extend through the second section 104 and connect with the third section 106 and/or the connector plate 108. In this configuration the first end 109 may act as a seal for connecting the first, second, and third recessed areas in operational concert. In an alternative embodiment, the first end 109 may connect with the second section 104 by at least partially surrounding the second section 104. A second end 111 of the first section 102 is where the arm 120 extends from the housing.

The second section 104 provides a housing which defines the second recessed area 105 and connects with the lock bar 164. The second recessed area 105 of the second section 104 at least partially encompasses the lock mechanism, including the first, second, and third lock plates, the lock bracket, the first and second springs, and the lock bar. The handle 150 is at least partially received within the second section 104, engaging with the first lock plate 152 within the second section 104. A first side 113 of the second section 104 is connected against the first end 109 of the first section 102 when the first and second sections are connected together. A second side 115 is connected against the third section 106 to form the housing.

In a preferred embodiment, the third section 106 is constructed as a hollow rectangular member. The third section 106 defines the third recessed area 107 and has the connector plate 108 connected proximal to a first end 117. The first end 117 further connects against the second side 115 of the second section 104 when the second and third sections are connected together. A second end 119 of the third section 106 connects with a baffle 170. The baffle 170 may connect with the second 119 through use of a variety of fasteners, such as screws, bolts, clips, pins, and the like or through use of various mechanical connection mechanisms, such as a compression lock system, snap fit system, friction fit system, and the like. The connection of the baffle 170 with the second end 119 allows the baffle 170 to extend and retract. The extension and retraction of the baffle 170 may be caused by the arm 120 being variously positioned through the housing and engaging with the baffle 170. For example, when the arm 120 is not being used the arm 120 may be retracted into the housing. The retraction may cause the arm 120 to extend out from the second end 119 of the third section 106. This extension from the second end 119 may cause the arm 120 to contact with the baffle 170 and force the extension of the baffle 170. Thus, it is to be understood that as the arm 120 is extended out from the second end 111 of the first section 102 it is retracted through the second end 119 of the third section 106 causing the baffle 170 to retract as contact with the arm 120 is lessened.

The receiver 110 is connected with the third section 106 between the first end 117 and the second end 119. In a preferred embodiment, the receiver 110 connects with the bracket 112 through use of a fastener, such as a clip, pin, bolt, screw, and the like. The connection of the bracket 112 to the receiver 110 allows the third section 106 to pivot relative to the bracket 112. Thus, the connection of the receiver 110 to the bracket 112 provides an axis about which the third section 106 and the housing pivot. The pivoting allows the housing and the arm 120 to be re-positioned which may promote the proper use of the arm 120.

Figure 3:
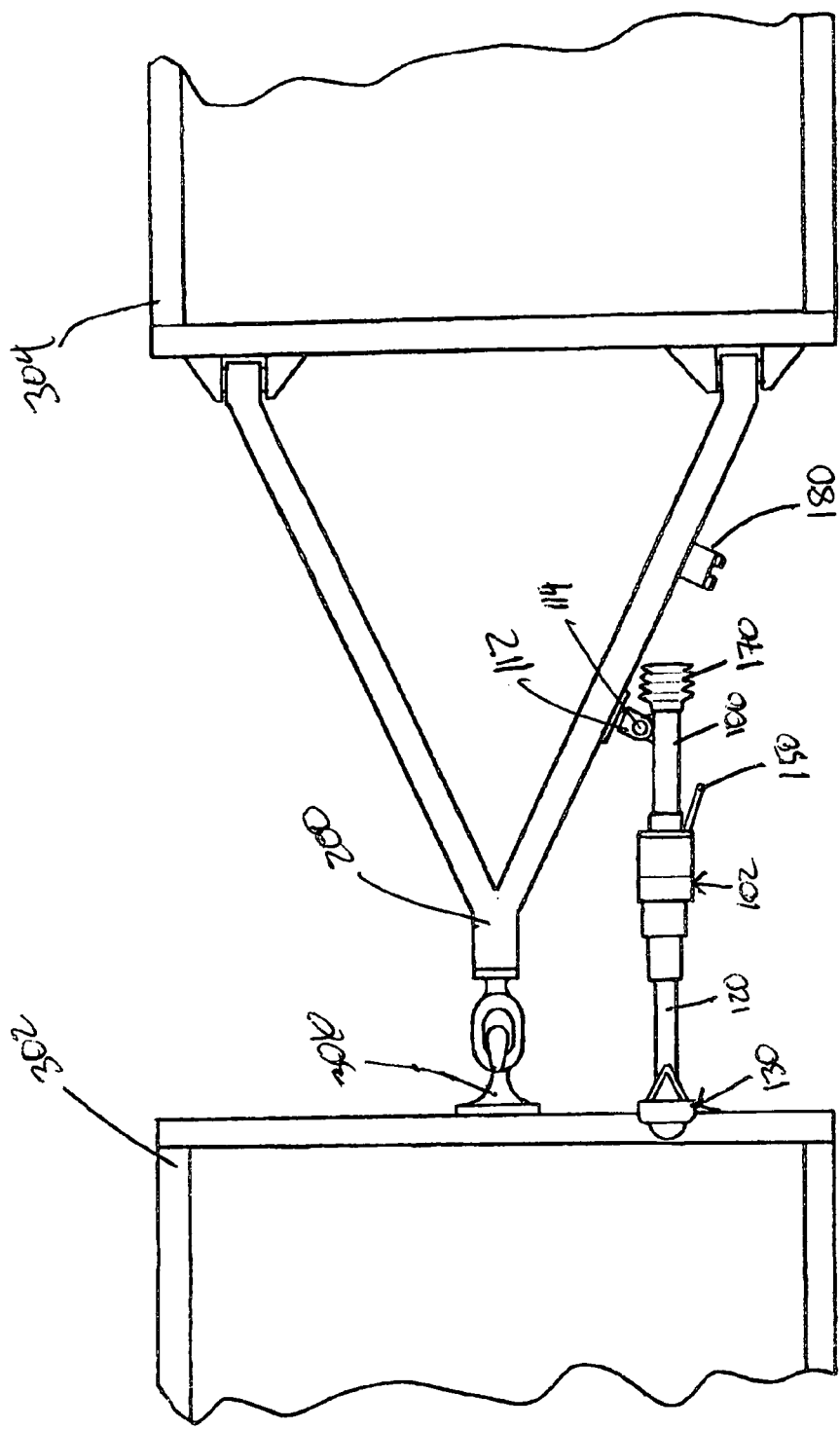
FIG. 3 is a top view illustrating the secondary trailer hitch connected with the jiff lox dolly, the secondary trailer hitch being further connected against a vehicle.
Figure 4:
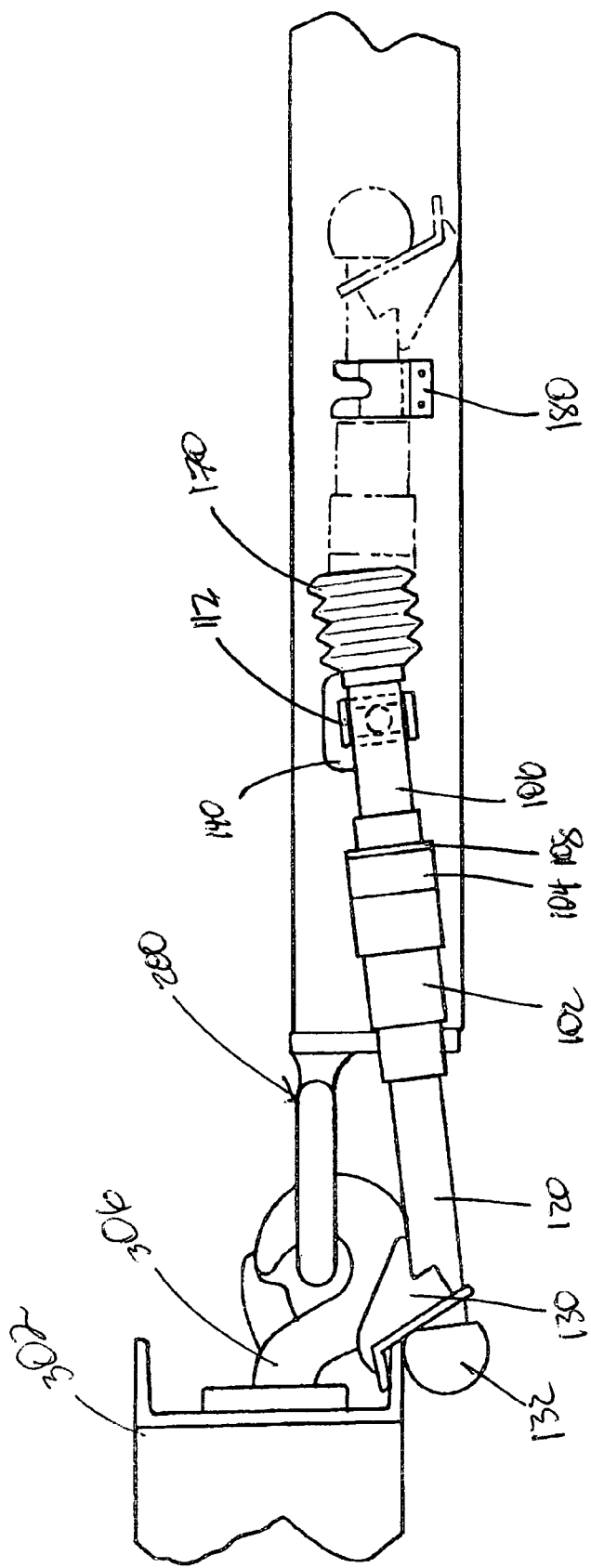
FIG. 4 is a side view illustrating the secondary trailer hitch connected with the jiff lox dolly and the vehicle and showing the secondary trailer hitch capable of seating in a support.

A mount plate 140 connects with a jiff hitch 200, as shown in FIGS. 1, 3, and 4. It is contemplated that the mount plate 140 may connect with various vehicles and/or devices connected to vehicles. As shown in FIG. 3, the jiff hitch 200 provides for the connection of a second "trailing" vehicle 304 with a first "lead" vehicle 302 by connecting with a jiff hook 306 attached to the rear of the first vehicle 302. The first vehicle 302 is a trailer and the second vehicle is a second trailer, in the embodiment shown in FIG. 3. It is contemplated that the first vehicle 302 may be a tractor, or various other vehicles which allow for connection with the second vehicle 304. The mount plate 140 connects with the jiff hitch 200 through the use of various fasteners which connect through an adapter 142, a first fastening point 144 and a second fastening point 146 included on the mount plate 140. The first and second fastening points allow the fastener to insert through the mount plate 140 and into an arm of the jiff hitch 200. The adapter 142 connects with the bracket 112 and then a fastener is inserted through the adapter 142 for connecting with the arm of the jiff hitch 200. It is understood that the fasteners employed may vary, such as screws, bolts, clips, pins, and the like. Further, the fastener inserted into the adapter 142 may include a washer or be configured with a flat top in order to provide a stop for the bracket 112 in its connection with the adapter 142.

The bracket 112 is allowed to rotate about the adapter 142. The rotation of the bracket 112 allows the housing to be rotated from a first position to a second position, as shown in FIG. 4. The first position is that position whereby the arm 120 may be extended and connected against the first vehicle 302 to provide the functionality of the present invention, whereby a trailing vehicle is enabled to be reversed in a straight, lineal manner with respect to the lead vehicle. The second position is that position whereby the arm 120 is seated upon the storage support 180. In this position the apparatus may be securely stowed allowing for forward or normal towing to occur.

In a preferred embodiment the arm 120 is a steel bar having the brace 132 and bracket 130 of the bumper mechanism connected at the second end 124. The first end 122 is at least partially inserted within the housing. The first end 122 may be re-positioned within the housing by sliding the arm 120 in and out of the housing. The arm 120 is of sufficient length to connect the bumper mechanism with a lead vehicle when the trailing vehicle is connected with the lead vehicle. The bumper mechanism being constructed to connect with the frame of the lead trailer. It is contemplated that the length of the arm 120 may be varied to accommodate the connection of various trailing vehicles to various lead vehicles. Further, the composition of the arm 120 may vary to include, various metals, composites, and the like which provide sufficient structural integrity, i.e., rigidity, to support the proper operation of the secondary trailer hitch 100.

It is contemplated that the width and depth dimensions of the arm 120 may be varied. The variation of these dimensional characteristics of the arm 120 may correspond with different dimensional characteristics of the first, second, and third recessed areas provided by the housing or the recessed areas of the housing may be correlated to the dimensional characteristics of the arm 120.

Figure 5A:
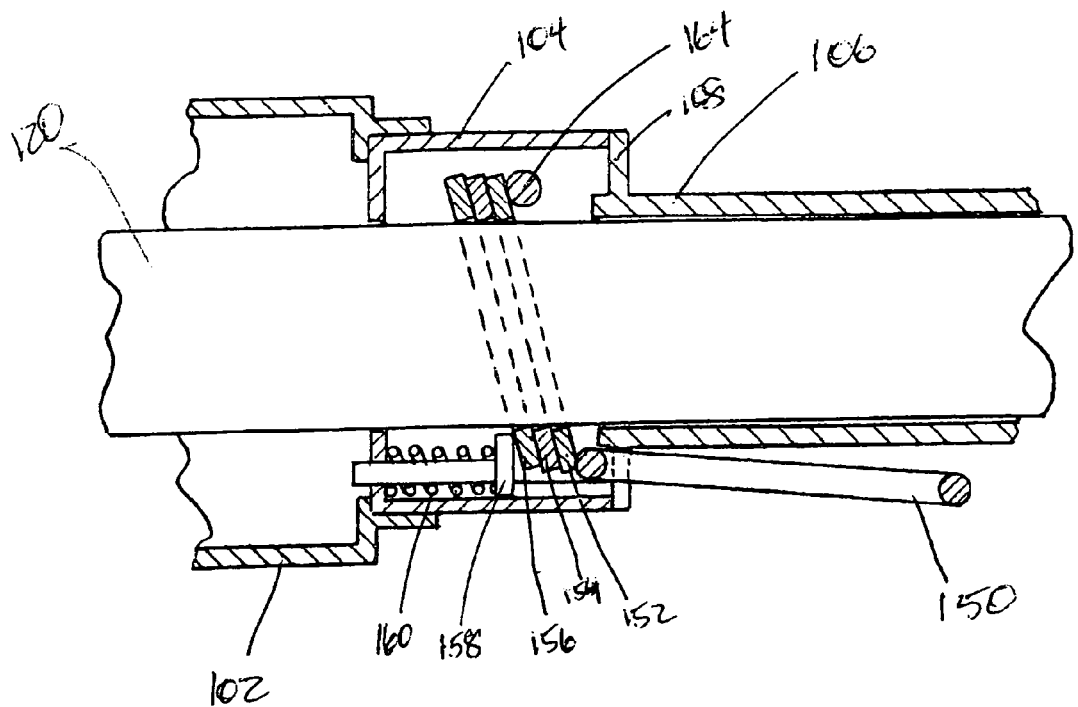
FIG. 5A is a cut-away side view illustrating a lock of the secondary trailer hitch, the lock set in a first position for securing the position of an arm within a housing of the secondary trailer hitch.
Figure 5B:
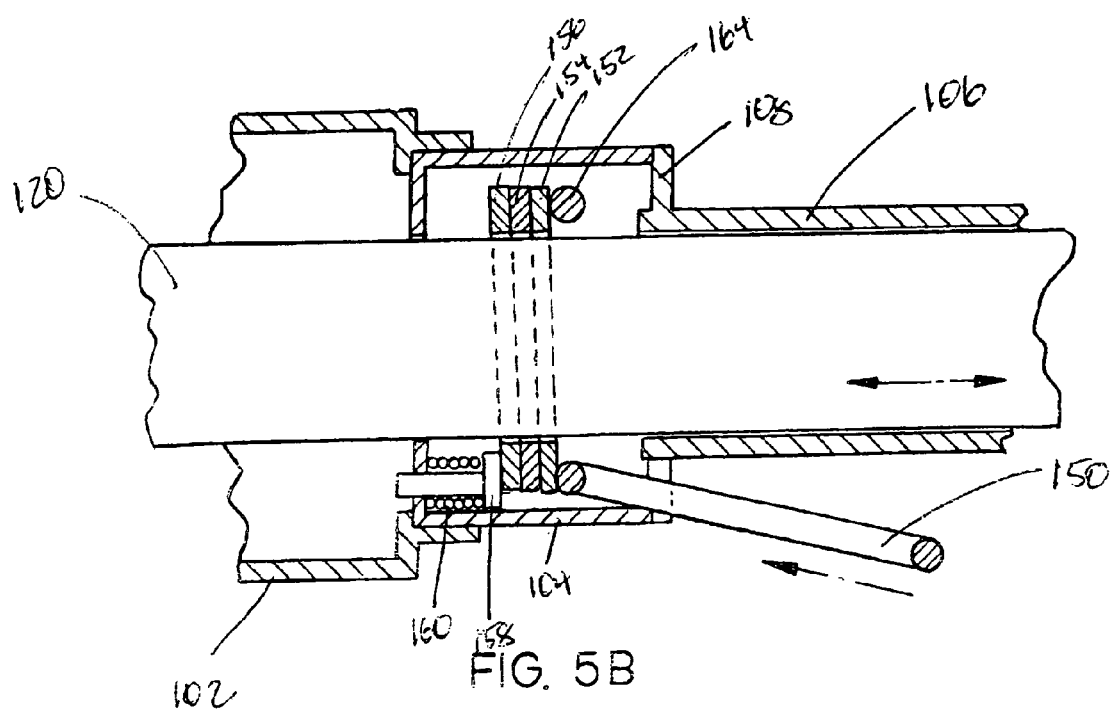
FIG. 5B is a cut-away side view illustrating the lock of the secondary trailer hitch, the lock set in a second position for allowing the movement of the arm within the housing.

Referring now to FIGS. 5A and 5B, the lock mechanism provides for the securing of the position of the arm 120 within the housing. In a first "lock" position, shown in FIG. 5A, the first, second and third lock plates are positioned at a non-perpendicular angle relative to the direction of movement capable by the arm 120. This positioning engages the lock plates against the arm 120. With the lock plates engaged against the arm 120, the arm 120 is securely affixed in position. The force provided to maintain the lock plates in the first position comes from the first spring 160 and second spring 162 (not shown in FIGS. 5A and 5B) which engage against the third lock plate 156 through the lock bracket 158. In the first position the first and second spring 160 and 162 are in an extended position. The extension of the springs causes the lock plates to pivot about the lock bar 164, which engages against the first lock plate 152. The lock bar 164 provides an axis of rotation about which the lock plates may be rotated, such as through the force exerted by the first and second springs.

In a second "open" position, shown in FIG. 5B, the lock plates are positioned perpendicularly to the direction of movement of the arm 120. In this position the arm 120 is allowed to slide within the housing for re-positioning of the arm 120. To establish the second position, a user may engage with the handle 150 and as shown by the direction of the arrow in FIG. 5B, push the handle 150 within the second section 104. The pushing of the handle 150, in the direction indicated by the arrow, forces the lock plates to pivot about the axis provided by the lock bar 164. The first and second springs are compressed through the force exerted upon the lock bracket 158 from the handle 150. The compression of the springs allows the lock plates to be rotated until they have reached the second position whereby the arm 120 may be moved.

It is contemplated that the first and second springs may be composed of various materials, such as various metals, composites, and the like, providing various spring force to the springs. The materials and spring force employed may be determined by those of skill in the art to provide for the functionality of the secondary trailer hitch 100. The first and second springs may be connected with the second section 104 in various locations which allow for engagement with the lock bracket 158 and the lock plates. In the alternative, the first and second springs may be connected with the first end 109 of the first section 102. It is further contemplated that the first and second springs may connect about a first and second post, respectively. The first and second posts may provide structural integrity to the first and second springs, assisting in avoidance of spring malfunctions. The first and second posts may be enabled to slide within the second section 104 allowing for the full range of movement of the springs.

The mounting of the secondary trailer hitch 100 may allow a lead vehicle to be connected with the mount plate 140, thereby, providing the arm 120 extending from the lead vehicle to connect against a trailer. The arm 120 may engage the bumper mechanism against the trailer for securing the secondary trailer hitch 100. The mounting of the secondary trailer hitch 100 upon the lead vehicle is optimized to provide a secure connection with variously configured trailers. Thus, the secondary trailer hitch 100 may be mounted in various positions upon the lead vehicle. It is to be understood that the configuration of the secondary trailer hitch 100 allows for its retro-fitting with various vehicles and/or trailers. It is contemplated that the configuration of the secondary trailer hitch 100 may be varied, for example the arm 120 may be constructed with varying lengths, in order to accommodate the proper operation of the secondary trailer hitch 100 when mounted on various vehicles and/or trailers.

Figure 6:
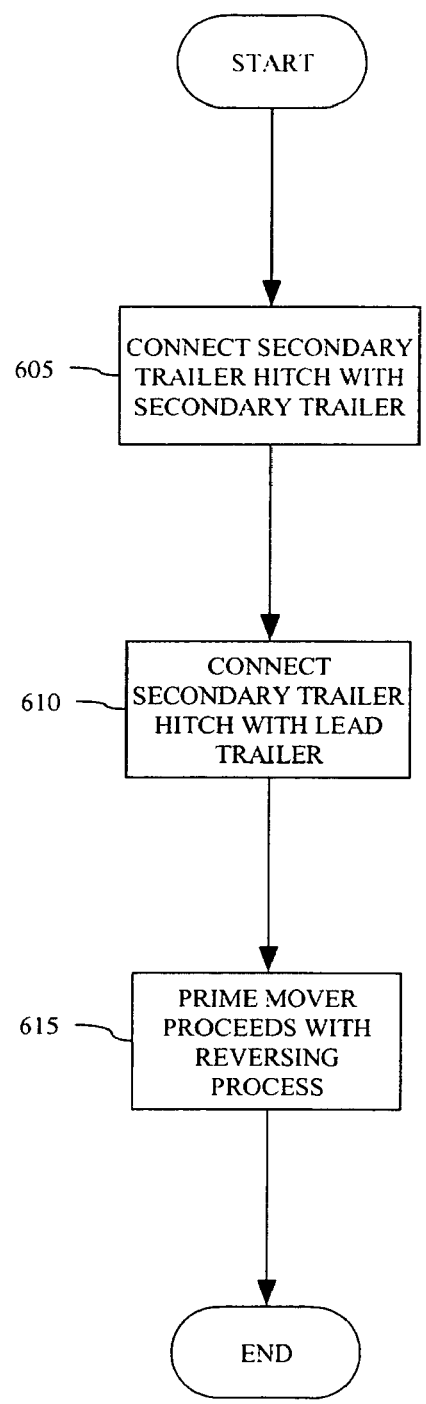
FIG. 6 is a method of reversing a tractor trailer including a prime mover connected to a lead trailer connected to a secondary trailer and utilizing the secondary trailer hitch for further connecting the secondary trailer with the lead trailer.

Referring now to FIG. 6, a method of reversing a tractor trailer including a prime mover connected with a lead trailer connected with a secondary trailer, is provided by the present invention. In a first step 605 a secondary trailer hitch 100 is connected with the secondary trailer. The connection of the secondary trailer hitch 100 being in a position which allows the secondary trailer hitch 100 to connect with the lead trailer in a second step 610. With the secondary trailer hitch connected to the lead trailer the prime mover may proceed in the reversing process, in step 615, resulting in the lead and secondary trailers proceeding in a lineal, straight reversing movement.

It is contemplated that the method may include the step of engaging the lock mechanism to re-position the arm 120 for its connection with the lead trailer. Further, the lock mechanism may be released to secure the position of the arm 120 once the connection of the bumper mechanism with the lead trailer is made. After the reversing process is completed, the method may include the step of releasing the bumper mechanism from engagement with the lead trailer. After releasing the bumper mechanism from engagement with the lead trailer, the secondary trailer hitch 100 may be configured in the second position whereby the secondary trailer hitch 100 is seated upon the storage support 180.

Referring generally to FIGS. 7-12B, alternative embodiments of the apparatus (ex—a secondary trailer hitch 700) include a housing 702. The housing 702 has a first end 742 and a second end 743 and defines a recessed area 703 which extends at least substantially the length of the housing 702. In an exemplary embodiment, the housing 702 is constructed as a generally hollow, rectangular member. The housing 702 includes a receiver 704 which facilitates connection of the housing 702 with a bracket 706. Through its connection with the bracket 706, the housing 702 is further connected with a mounting mechanism. The mounting mechanism includes a mount plate 708 having an aperture 710 formed therethrough. The aperture 710 is configured for receiving an adapter 712 connected to the bracket 706, thereby allowing connection of the mount plate 708 and the bracket 706. The mount plate 708 further includes a plurality of fastening points (714, 716, 718 and 720) which allow for the connection of the mount plate 708 to a jiff hitch 200 (described above) which is connected to the vehicles, such as the lead trailer and/or secondary trailer, or various other locations upon the vehicles.

An arm assembly includes an arm 722 having a first end 724 and a second end 726. The first end 724 of the arm 722 is configured for allowing the arm 722 to be received by and to be slidably positionable within the housing 702. For instance, the recessed area 703 of the housing 702 is configured for receiving the arm 722 and for allowing the arm to be slidably inserted and positioned within the housing 702. The arm assembly further includes a bumper mechanism configured for attachment to the second end 726 of the arm 722. The bumper mechanism includes a bumper bracket 728 and a brace 730. In exemplary embodiments, the arm 722 is capable of being re-positioned within the housing through the use of a securing mechanism, which connects with both the housing 702 and the arm 722. For example, the securing mechanism may be a handle 732 configured for allowing a user to adjust the position of the arm 722 within the housing 702 and further configured for allowing a user to secure the arm 722 against a vehicle. The handle 732 is configured for adjustably positioning the arm 722 within the housing 702 by mechanically engaging a gear assembly. The handle 732 may connect with the housing 702 through use of a variety of fasteners, such as screws, bolts, clips, pins, and the like. The housing 702 is constructed to provide a defined length which may be determined as optimal for supporting the use of the arm 722, while still allowing for storage or seating of the secondary trailer hitch 700, such as via a storage support 780, when the arm 722 is not in use.

Figure 8B:
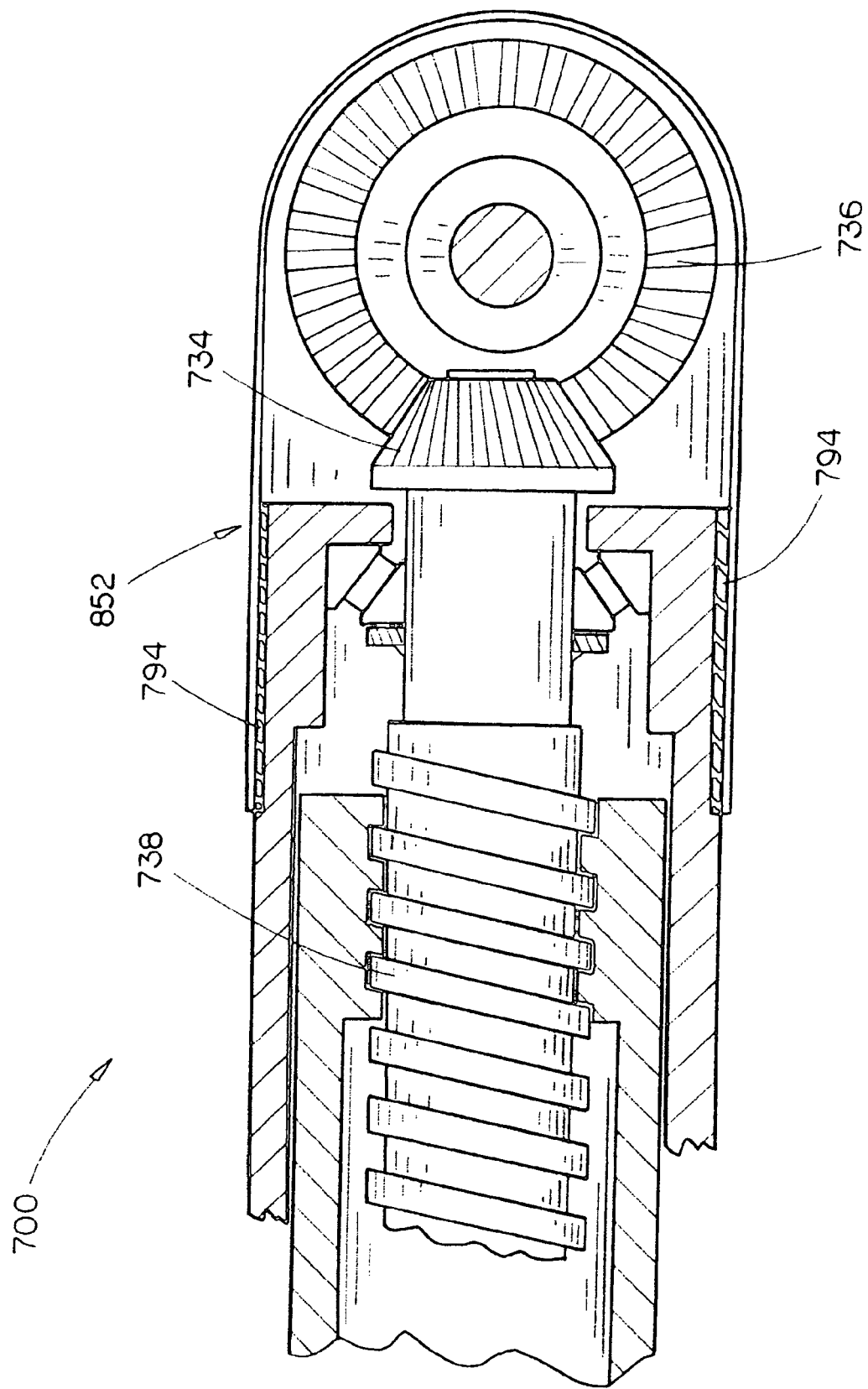
FIG. 8B is a top cut-away view of a secondary trailer hitch including a tapered roller bearing cone and cup assembly in accordance with an alternative exemplary embodiment of the present invention.

In an exemplary embodiment, the gear assembly includes a first gear 734 and a second gear 736. In a present embodiment, the first gear 734 and the second gear 736 are rotatably interlocked, with the first gear being perpendicularly oriented with respect to the second gear. For instance, the gear assembly may be configured to have a 2:1 (two-to-one) gear ratio. The 2:1 gear ratio promotes ease of disengagement of the secondary trailer hitch 700 when the hitch 700 is under tension or compression. Further, the 2:1 gear ratio provides for infinite length adjustment capabilities of the secondary trailer hitch 700 of the present invention between a shortest extreme position and a longest extreme position, which serve to prevent articulation of a connected converter dolly. The gear assembly may further be connected to a drive assembly. The drive assembly may include a drive shaft 738, such as a threaded shaft or worm drive, the drive shaft 738 having a first end 740 configured for being connected to and rotating with (i.e., being rotatably connected to) the first gear 734. The drive shaft 738 is further configured for being at least substantially received within the housing 702 and connected to the gear assembly via an aperture 735 formed within housing 702 proximal to a first end 742 of the housing 702. The drive shaft 738 further includes a second end 744 configured for being threadably received by and connected with the arm 722 via an aperture 746 formed within the first end 724 of the arm 722. The drive assembly may further include a roller bearing 748 for promoting ease of rotation within the housing 702 for the rotatably connected drive shaft 738. (as shown in FIG. 8A). In alternative embodiments, the drive assembly may include a tapered roller bearing cone and cup assembly 852 for promoting ease of movement within the housing 702 for the drive shaft 738, as shown in FIGS. 8B and 12B. Further, the housing 702 may include cross-drilled spring pins for retaining at least one of the first gear 734 and the second gear 736. Additionally, the housing 702 may include one or more anti-rattle foam pads 790, which may also function as environmental seals for protecting the hitch 700 from the elements. Further, one or more of the housing 702 and the arm 722 may contain environmental seals 792 and 794, such as foam rubber seals, for protecting the hitch 700 from the elements.

Figure 7:
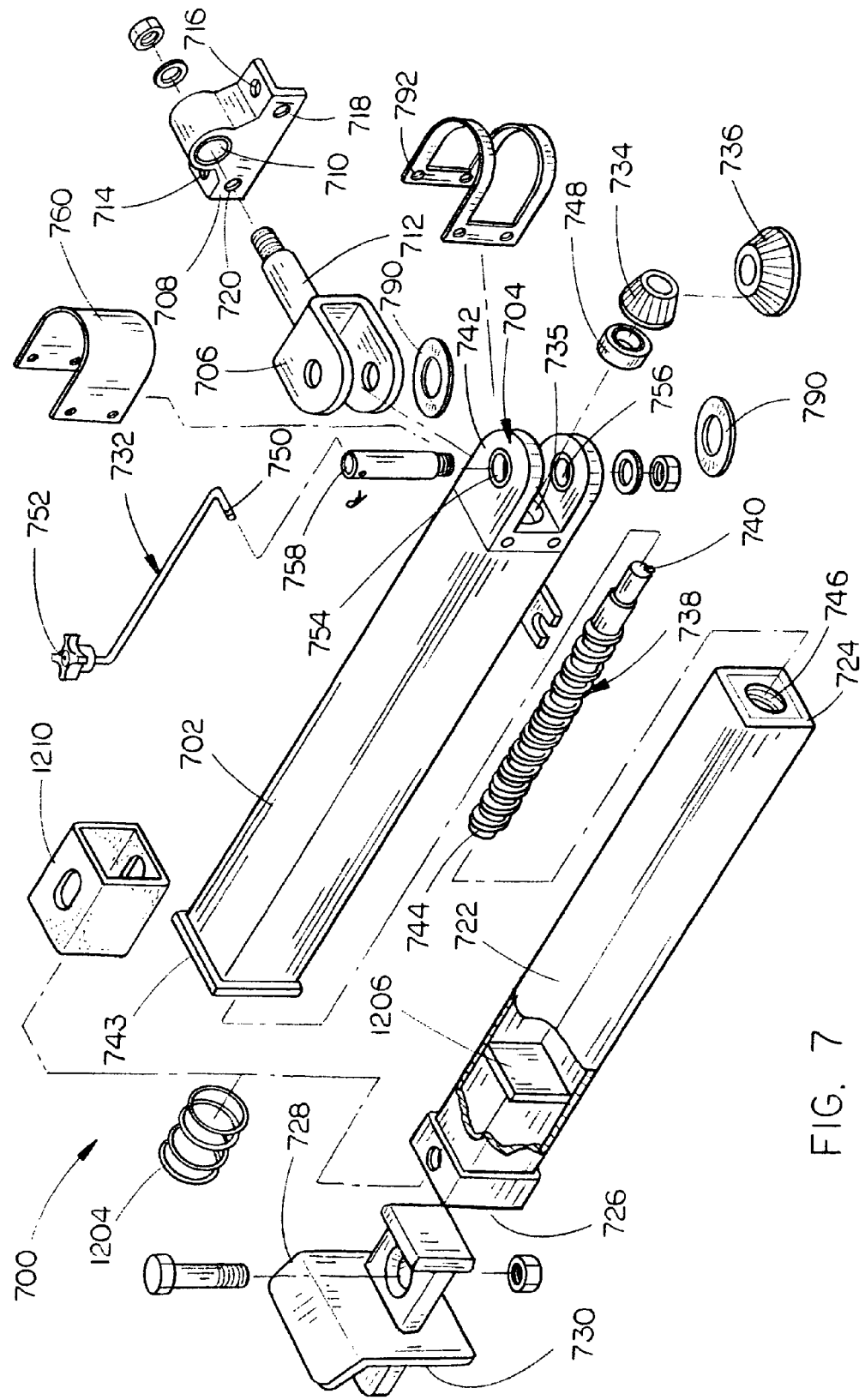
FIG. 7 is an exploded view of a secondary trailer hitch in accordance with an alternative exemplary embodiment of the present invention.

In a current embodiment, the handle 732 may be maneuverable for driving the gear assembly. For example, the handle, which may be an S-shaped handle (as shown in FIG. 7), may have a first end 750 configured for connection with the gear assembly and a second end 752 configured with a gripping portion, such as a star-shaped gripping portion, for being grasped by a user. Further, the handle 732 may be rotatably connected via the housing 702 with the gear assembly so that the handle may be rotated 360 degrees in both a clockwise and counter-clockwise direction for driving the gear assembly. Rotating the handle in a first direction (ex—clockwise or counterclockwise) drives the interlocked gears (734, 736) in such a manner that the gear assembly causes the drive shaft 738, via its connection with the first end 724 of the arm 722, to extend, such as telescopically extend, the arm 722 lengthwise from the housing 702. The extension of the arm 722 from the housing 702 may occur in an incremental fashion, thereby allowing the bumper bracket 728 and brace 730 to be secured against a vehicle/trailer for securing/stabilizing the connection of the secondary trailer hitch 700 (via tensioning of the handle 732) between two vehicles, two trailers, or a prime mover and a trailer.

Further, the handle 732 may also be rotated in a second direction, the second direction being generally opposite the first direction. Rotating the handle 732 in the second direction drives the gears (734, 736) in such a manner so as to cause the drive shaft 738, via its connection with the first end 724 of the arm 722, to retract, such as telescopically retract, the arm 722 lengthwise into the housing 702. The retraction of the arm 722 into the housing 702 may also occur in an incremental fashion, thereby allowing the secondary trailer hitch 700 to be disconnected from between two vehicles/trailers. The exemplary embodiment of the present invention described above, and shown in FIGS. 7-10, provides a secondary trailer hitch 700 which may be disconnected and/or removed from between 2 vehicles/trailers, (for instance, by maneuvering the handle 732) even when under engagement tension or pressure (i.e., when engaged between 2 vehicles/trailers), which may promote easier disconnection and connection of the secondary trailer hitch 700 between 2 vehicles and may also promote more efficient switching of trailers (such as 28 foot trailers). The above-described incremental adjustment capabilities of the arm 722 may allow the secondary trailer hitch 700 to provide virtually infinite lengthwise adjustment capabilities, thereby allowing the secondary trailer hitch 700 to be modified or adapted to whichever lead vehicle is being utilized.

Figure 10:
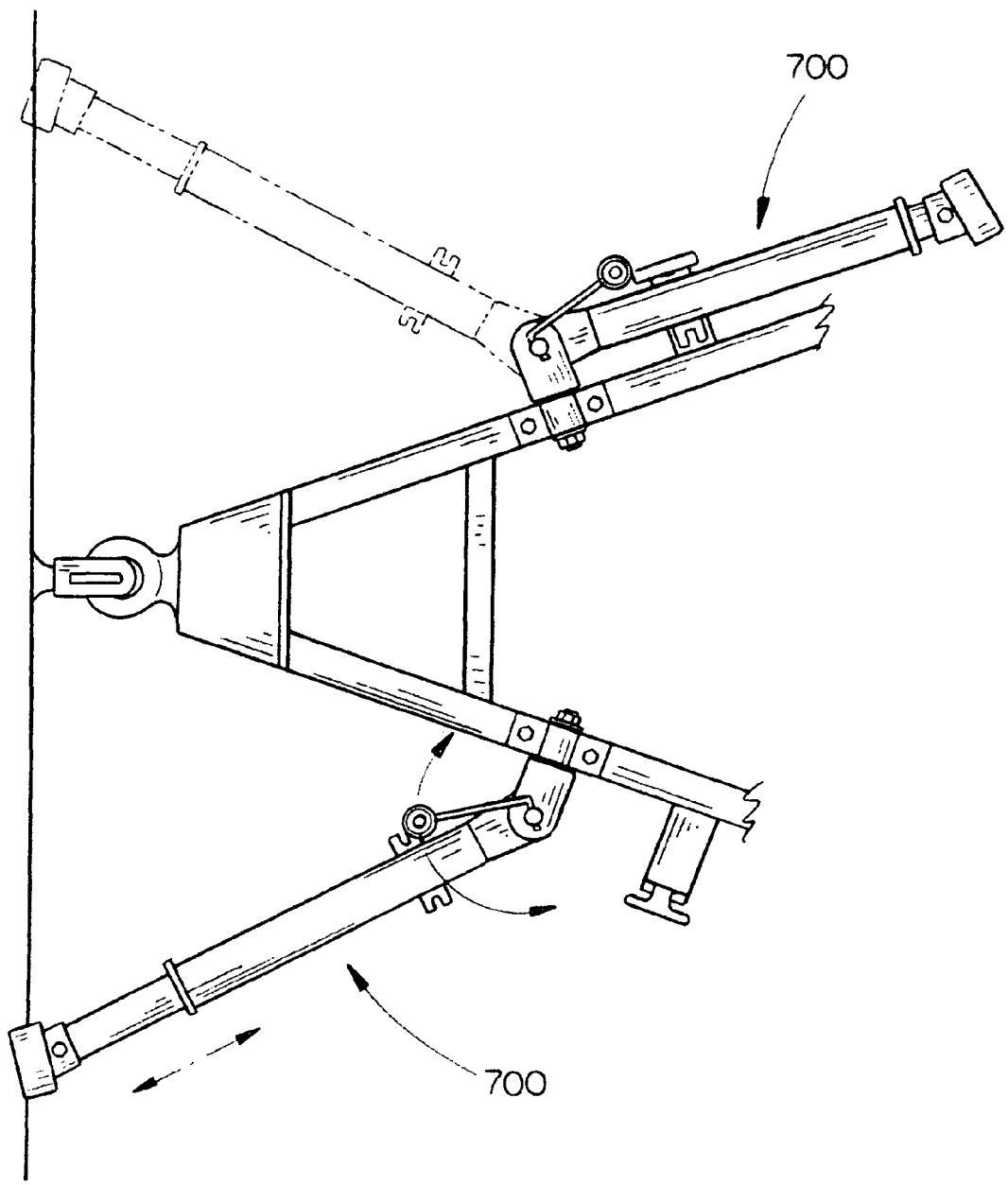
FIG. 10 is a top view of a secondary trailer hitch shown in accordance with an exemplary embodiment of the present invention.
Figure 11:
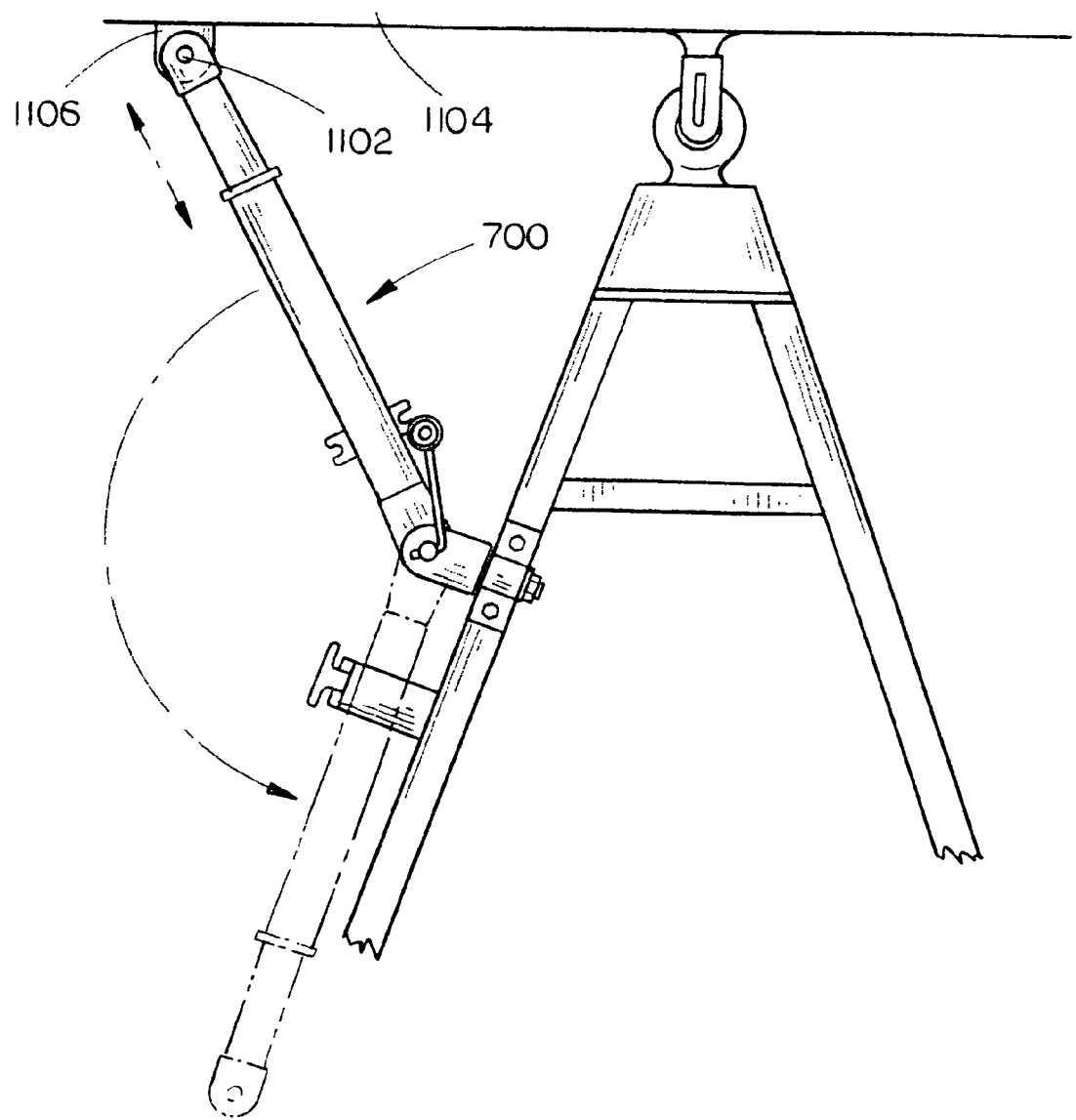
FIG. 11 is a view showing implementation of a single, secondary trailer hitch in accordance with an exemplary embodiment of the present invention.

The bracket 706 may be pivotally or rotatably connected with the housing 702. The pivoting capabilities of the bracket 706 allow the housing 702 to be rotated from a first position to a second position, as shown in FIG. 10. The first position is that position whereby the arm 722 may be extended and connected against a first vehicle 802 to provide the functionality of the present invention, whereby a trailing vehicle 804 is enabled to be reversed in a straight, lineal manner with respect to the lead vehicle, via pressure & lineal stability provided when the secondary trailer hitch 700 is extended & braced between the 2 vehicles. The second position is that position whereby the arm 722 is seated upon a storage support 780. In this position the secondary trailer hitch 700 may be securely stowed allowing for forward or normal towing to occur. The above-described pivotal connection between the bracket 706 and the housing 702, further allows the housing 702 to be positioned so that the secondary trailer hitch 700 may be modified or adapted to whichever lead vehicle is being utilized. In exemplary embodiments, more than one secondary trailer hitch 700 may be implemented between the 2 vehicles. In embodiments in which a single, secondary trailer hitch 700 is implemented (i.e., a single strut application, such as in FIG. 11), a hitch pin 1102 may be utilized for connecting the single, secondary trailer hitch (ex—strut) 700 to the rear of a trailer 1104 via a lug 1106 on the rear of the trailer.

The receiver 704 includes one or more apertures (754, 756) formed within the housing 702 proximal to the first end 742 of the housing 702 for allowing connection of the bracket 706 with the housing 702. In an exemplary embodiment, the bracket 706 is connected with the housing 702 via a fastener, such as a clip, pin 758, bolt, screw, and the like, and is received via the apertures 754, 756, said apertures (754, 756) being aligned for receiving the fastener. The connection of the bracket 706 to the housing 702 allows the housing 702 to pivot relative to the bracket 706. Thus, the connection of the bracket 706 to the housing 702 provides an axis about which the housing 702 may pivot. The pivoting allows the housing 702 and the arm 722 to be re-positioned for promoting the proper use of the arm 722.

In exemplary embodiments, the mount plate 708 is configured for connection with a jiff hitch 200. For example, the mount plate 708 may mount on a top rail of a jiff hitch or tongue of a converter dolly. It is contemplated that the mount plate 708 may connect with various vehicles and/or devices connected to vehicles. As shown in FIG. 3, the jiff hitch 200 provides for the connection of a second "trailing" vehicle 304 with a first "lead" vehicle 302 by connecting with a jiff hook 306 attached to the rear of the first vehicle 302. The first vehicle 302 is a trailer and the second vehicle is a second trailer, in the embodiment shown in FIG. 3. It is contemplated that the first vehicle 302 may be a tractor, or various other vehicles which allow for connection with the second vehicle 304. The mount plate 708 may connect with the jiff hitch 200 through the use of various fasteners which connect through the fastening points (714, 716, 718 and 720) into an arm of the jiff hitch 200. Further, the adapter 712 may be threaded on one end, the threaded end being received via aperture 710 of the mount plate 708 and secured to the mount plate 708 via a nut and washer (as shown in FIG. 7), for securing the bracket 706 to the mount plate 708. It is understood that the fasteners employed may vary, such as screws, bolts, clips, pins, and the like. In further embodiments, the secondary trailer hitch 700 may also be configured to be connected or engaged between a car and an RV, a first trailer and a second trailer, and/or a boat and a trailer.

In an exemplary embodiment the arm 722 is a steel bar having the brace 730 and bracket 732 of the bumper mechanism connected at the second end 726. The first end 724 is at least partially inserted within the housing 702. The first end 724 may be re-positioned within the housing by slidably positioning the arm 722 in and out of the housing 702. The arm 722 is of sufficient length to connect the bumper mechanism with a lead vehicle when the trailing vehicle is connected with the lead vehicle. The bumper mechanism may be constructed to connect with the frame of the lead trailer. It is contemplated that the length of the arm 722 may be varied to accommodate the connection of various trailing vehicles to various lead vehicles. Further, the composition of the arm 722 may vary to include, various metals, composites, and the like which provide sufficient structural integrity, i.e., rigidity, to support the proper operation of the secondary trailer hitch 700.

It is contemplated that the width and depth dimensions of the arm 722 may be varied. The variation of these dimensional characteristics of the arm 722 may correspond with different dimensional characteristics of the recessed area provided by the housing 702 or the recessed area of the housing 702 may be correlated to the dimensional characteristics of the arm 722. In exemplary embodiments, an outer cover 760 is included for covering/shielding the gear assembly. The second end 742 of the housing 702 may have one or more apertures formed therein for allowing the outer cover 760 to be secured to the second end 742 of the housing 702 via one or more fasteners, such as cross pins.

The mounting of the secondary trailer hitch 700 may allow a lead vehicle to be connected with the mount plate 708, thereby, allowing the arm 722 extending from the lead vehicle to connect against a trailer. The arm 722 may engage the bumper mechanism against the trailer for securing the secondary trailer hitch 700. The mounting of the secondary trailer hitch 700 upon the lead vehicle is optimized to provide a secure connection with variously configured trailers. Thus, the secondary trailer hitch 700 may be mounted in various positions upon the lead vehicle. It is to be understood that the configuration of the secondary trailer hitch 700 allows for its retro-fitting with various vehicles and/or trailers. It is contemplated that the configuration of the secondary trailer hitch 700 may be varied, for example the arm 722 may be constructed with varying lengths, in order to accommodate the proper operation of the secondary trailer hitch 700 when mounted on various vehicles and/or trailers.

Figure 9:
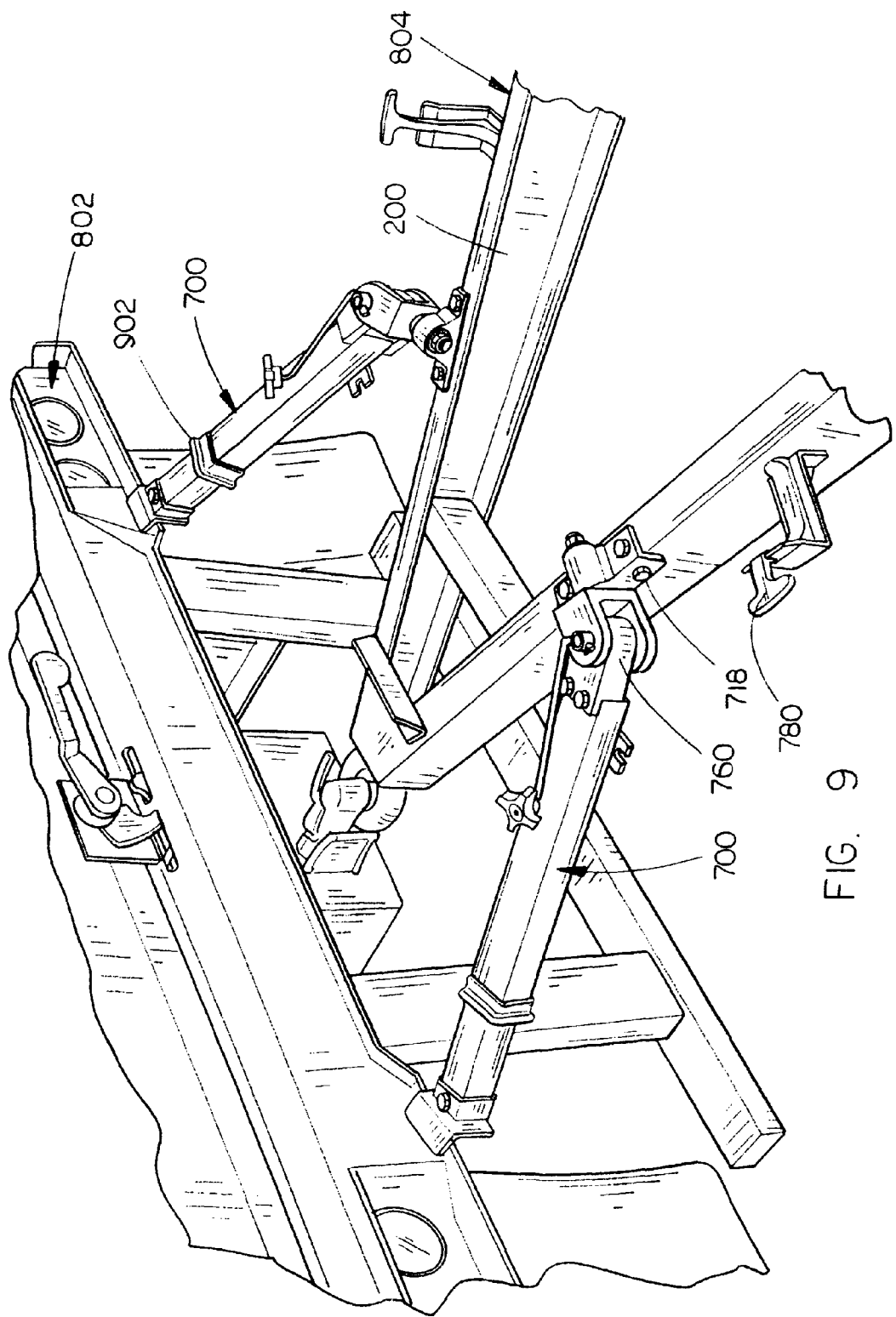
FIG. 9 is an isometric view of a secondary trailer hitch in accordance with an exemplary embodiment of the present invention.

In further embodiments, the secondary trailer hitch 700 includes an environmental seal boot 902 (as shown in FIG. 9) for being at least partially sleeved over or around the second end 743 of the housing 702 for protecting an area where the arm 722 inserts into the housing 700 from the elements. The environmental seal boot 902 thereby promotes usage of the secondary trailer hitch 700 in slush and ice conditions typically found in northerly winter climates.

Figure 12A:
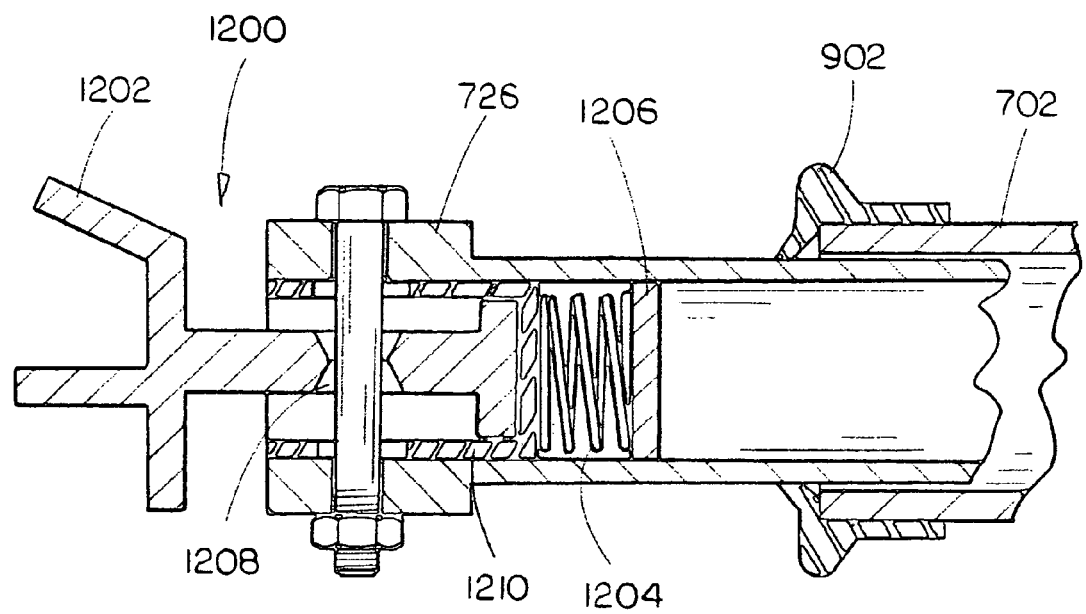
FIG. 12A is a side cut-away view of a secondary trailer hitch including a spring-loaded head assembly in accordance with an alternative exemplary embodiment of the present invention.
Figure 12B:
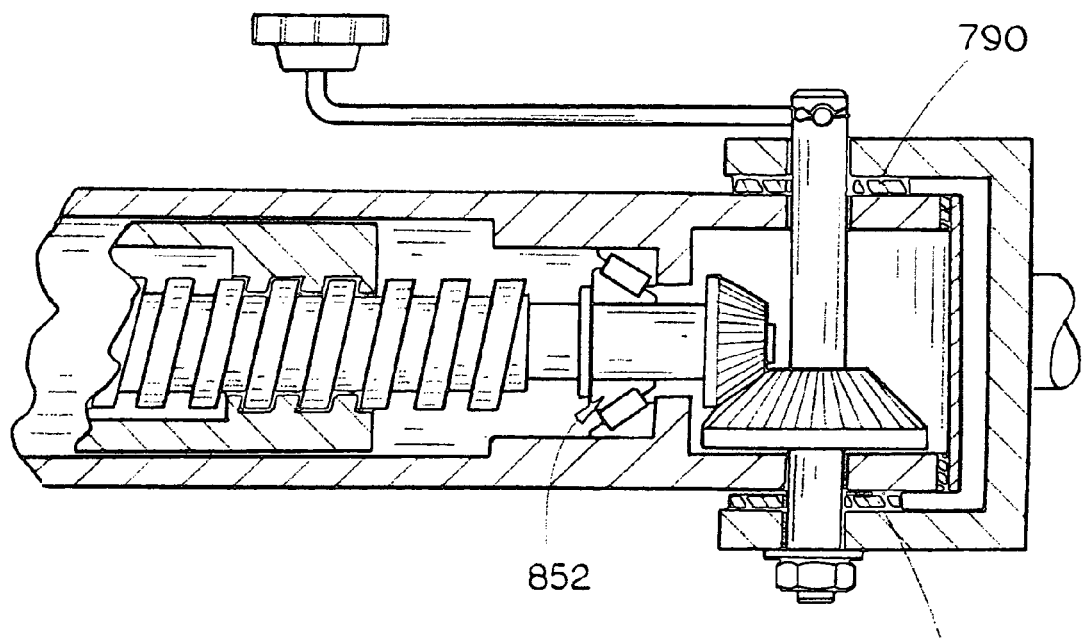
FIG. 12B is a side cut-away view of a secondary trailer hitch including a tapered roller bearing cone and cup assembly in accordance with an alternative exemplary embodiment of the present invention.

In an alternative embodiment, as shown in FIG. 12A, the arm 722 of the secondary trailer hitch 700 may include a head assembly 1200. The head assembly 1200 may include a head 1202 (ex—includes bumper bracket 728 and brace 730) configured for attachment to the second end 726 of the arm 722. The head assembly 1200 may further include a spring 1204 for connecting the head 1202 with a welded stop 1206 contained within the arm 722. The head 1202 protrudes lengthwise from the second end 726 of the arm 722, the head 1202 having an elongated through hole or slot 1208 (ex—a double-tapered through hole or slot) formed therein. The arm 722 may be extended lengthwise, such as via manipulation of the handle 732, as described above, for engaging the head 1202 against the rear of a trailer. In the embodiment shown in FIG. 12, when the arm 722 is extended, the spring 1204 fully compresses so that the head 1202 is allowed to be engaged and seated tightly against the rear of a trailer. However, if a user, when extending the arm 722 of the hitch 700 lengthwise, allows end-to-end play to exist, or if the end-to-end play is generated due to the connected vehicles traveling over uneven terrain, the spring 1204 becomes active and pushes the head 1202 outward. The outward motion of the head 1202 allows the head 1202 to remain engaged with the trailer (ex—such as by hanging on a rear lip of the trailer), and prevents the hitch 700 from dropping out of engagement. The spring 1204 and slot 1208 configuration allows for in and out movement of the head 1202 with respect to the arm 722 for ensuring continued engagement of the head with the back of a trailer. Additionally, the double tapered hole 1208 allows, via its construction, for movement of the head 1202 so that the head 1202 may be aligned at any incident angle of the hitch 700 to the rear of a trailer. Further, the arm 722 may contain an environmental seal 1210 for protecting the head assembly 1200 from the elements (ex.—rain, slush, ice, etc.).

It is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus, for use in towing a vehicle, comprising:
   a housing configured for being connected with a first vehicle being towed;
   an arm configured for being connected with the housing, the arm further configured for being secured against a second vehicle when the housing is connected with the first vehicle;
   a securing mechanism connected to the arm, the securing mechanism configured for allowing a user to secure the arm against the second vehicle, the securing mechanism being further configured for allowing a user to disengage the apparatus from the second vehicle when the apparatus is under engagement compression from both the first vehicle and the second vehicle;
   a drive assembly configured for being connected with the arm, the drive assembly further configured for allowing the arm to be selectively extended from and retracted into the housing; and
   a gear assembly configured for being connected with the drive assembly and the securing mechanism, the gear assembly configured for driving the drive assembly when driven by the securing mechanism for allowing the arm to be selectively extended from and retracted into the housing, wherein the apparatus provides for lineal, straight, reverse movement of the first vehicle in tow behind the second vehicle.

2. An apparatus as claimed in claim 1, wherein the gear assembly includes a first gear and a second gear, the first gear and the second gear being rotatably interlocked, the first gear being perpendicularly oriented with respect to the second gear.

3. An apparatus as claimed in claim 2, wherein the securing mechanism is a handle configured for being rotatably connected with the gear assembly via the housing, the gear assembly being rotatably connected to the drive assembly.

4. An apparatus as claimed in claim 3, wherein the gear assembly is configured with a two-to-one (2:1) gear ratio.

5. An apparatus as claimed in claim 4, wherein the drive assembly further includes a roller bearing for promoting ease of rotation within the housing for the rotatably connected drive assembly.

6. An apparatus as claimed in claim 5, wherein the arm includes a first end and a second end, the second end of the arm including a bumper mechanism for being secured against the second vehicle when the housing is connected with the first vehicle.

7. An apparatus as claimed in claim 6, further comprising:
a storage support for seating the apparatus when the apparatus is not in use.

8. An apparatus as claimed in claim 7, wherein the housing of the apparatus is pivotally connected to the first vehicle.

9. An apparatus, for use in towing one or more vehicles behind a prime mover, comprising:
a housing configured for being connected with a first vehicle being towed;
an arm configured for being connected with the housing, the arm further configured for being secured against a second vehicle when the housing is connected with the first vehicle;
a drive assembly configured for being connected with the arm, the drive assembly further configured for allowing the arm to be selectively extended from and retracted into the housing; and
a securing mechanism configured for being connected with a gear assembly via the housing, the gear assembly being connected to the drive assembly, the securing mechanism being further configured for driving the gear assembly for selectively causing the drive assembly to extend the arm from and retract the arm into the housing, the securing mechanism being further configured for allowing a user to disengage the apparatus from the second vehicle when the apparatus is under engagement compression from both the first vehicle and the second vehicle,
wherein the apparatus provides for lineal, straight, reverse movement of the first vehicle in tow behind the second vehicle.

10. An apparatus as claimed in claim 9, wherein the gear assembly includes a first gear and a second gear, the first gear and the second gear being rotatably interlocked, the first gear being perpendicularly oriented with respect to the second gear.

11. An apparatus as claimed in claim 10, wherein the securing mechanism is a handle configured for being rotatably connected with the gear assembly via the housing, the gear assembly being rotatably connected to the drive assembly.

12. An apparatus as claimed in claim 11, wherein the gear assembly is configured with a two-to-one (2:1) gear ratio.

13. An apparatus as claimed in claim 12, wherein the drive assembly further includes a roller bearing for promoting ease of rotation within the housing for the rotatably connected drive assembly.

14. An apparatus as claimed in claim 13, wherein the arm includes a first end and a second end, the second end of the arm including a bumper mechanism for being secured against the second vehicle when the housing is connected with the first vehicle.

15. An apparatus as claimed in claim 14, further comprising:
a storage support for seating the apparatus when the apparatus is not in use.

16. An apparatus as claimed in claim 15, wherein the housing of the apparatus is pivotally connected to the first vehicle.

17. An apparatus, for use in towing a plurality of vehicles behind a prime mover, comprising:
a housing configured for being connected with a first vehicle being towed;
an arm configured for being connected with the housing, the arm having a first end and a second end, the first end of the arm being configured for being insertably and slidably received within the housing, the second end of the arm including a bumper mechanism for being secured against a second vehicle when the housing is connected with the first vehicle;
a drive assembly having a first end configured for being connected with a gear assembly and a second end configured for being connected with the arm, the drive assembly is configured for allowing the arm to be selectively extended from and retracted into the housing; and
a handle configured for being rotatably connected with the gear assembly via the housing, the gear assembly being rotatably connected to the first end of the drive assembly, the gear assembly including a first gear and a second gear, the first gear and the second gear being rotatably interlocked, the first gear being perpendicularly oriented with respect to the second gear, the handle being further configured for being rotated in a first direction for driving the gear assembly and for causing rotation of the drive assembly for extending the arm from the housing, the handle being further configured for being rotated in a second direction for driving the gear assembly, the second direction being generally opposite the first direction, and for causing rotation of the drive assembly for retracting the arm into the housing, the handle being further configured for allowing a user to disengage the apparatus from the second vehicle when the apparatus is under engagement compression from both the first vehicle and the second vehicle,
wherein the apparatus provides for lineal, straight, reverse movement of the first vehicle in tow behind the second vehicle.

18. An apparatus as claimed in claim 17, wherein the gear assembly is configured with a two-to-one (2:1) gear ratio.

* * * * *